US012579930B2

(12) United States Patent
Lin et al.

(10) Patent No.: US 12,579,930 B2
(45) Date of Patent: Mar. 17, 2026

(54) MICRO-LED DISPLAY PANEL AND PIXEL DRIVING CIRCUIT THEREOF

(71) Applicant: AUO Corporation, Hsinchu City (TW)

(72) Inventors: Chih-Yang Lin, Hsinchu City (TW); Fu-Cheng Wei, Hsinchu City (TW)

(73) Assignee: AUO CORPORATION, Hsinchu City (TW)

( * ) Notice: Subject to any disclaimer, the term of this patent is extended or adjusted under 35 U.S.C. 154(b) by 0 days.

(21) Appl. No.: 18/976,776

(22) Filed: Dec. 11, 2024

(65) Prior Publication Data

US 2025/0372024 A1 Dec. 4, 2025

(30) Foreign Application Priority Data

May 29, 2024 (TW) ................................ 113119828

(51) Int. Cl.
*G09G 3/32* (2016.01)
*G09G 3/20* (2006.01)

(52) U.S. Cl.
CPC ............. *G09G 3/32* (2013.01); *G09G 3/2007* (2013.01); *G09G 2320/0242* (2013.01); *G09G 2330/021* (2013.01)

(58) Field of Classification Search
CPC ............... G09G 3/2003; G09G 3/2007; G09G 3/2014–204; G09G 3/32–3291; G09G 2300/0809; G09G 2300/0842; G09G 2300/0857–0866; G09G 2310/0243; G09G 2310/0294; G09G 2310/0297; G09G 2310/06; G09G 2310/08; G09G 2320/02; G09G 2320/0233; G09G 2320/0242; G09G 2320/0271; G09G 2320/0276; G09G 2330/021
See application file for complete search history.

(56) References Cited

U.S. PATENT DOCUMENTS

| | | | |
|---|---|---|---|
| 10,078,980 | B2 | 9/2018 | Kong et al. |
| 10,559,282 | B2 | 2/2020 | Shang et al. |
| 10,755,662 | B2 | 8/2020 | Kong et al. |

(Continued)

FOREIGN PATENT DOCUMENTS

CN 101017645 A * 8/2007 ........... G09G 3/3413

OTHER PUBLICATIONS

English translation of CN-101017645-A (Year: 2007).*

*Primary Examiner* — Nathan Danielsen
(74) *Attorney, Agent, or Firm* — Tim Tingkang Xia, Esq.; Troutman Pepper Locke LLP

(57) ABSTRACT

A micro-LED display panel and its pixel driving circuit are provided. A first multiplexer switches a base frequency clock signal to a frequency divider circuit or a first bit counter according to a grayscale data signal. The frequency divider circuit divides the base frequency clock signal transmitted by the first multiplexer into a divided base frequency clock signal. The first bit counter counts the base frequency clock signal transmitted by the first multiplexer to generate a first switching signal. A second bit counter counts the divided base frequency clock signal transmitted by the frequency divider circuit to generate a second switching signal. A switch controller switches a switch of at least one pixel circuit according to the first switching signal or the second switching signal.

10 Claims, 4 Drawing Sheets

(56) References Cited

U.S. PATENT DOCUMENTS

| | | | | |
|---|---|---|---|---|
| 2003/0107541 | A1* | 6/2003 | Naiki | G09G 3/3692 345/87 |
| 2005/0156812 | A1* | 7/2005 | Kinugasa | G09G 5/008 345/1.1 |
| 2011/0316816 | A1* | 12/2011 | Okuma | G09G 3/3688 345/204 |
| 2022/0013070 | A1* | 1/2022 | Ma | G09G 3/3275 |
| 2022/0327992 | A1* | 10/2022 | Chalmers | G09G 3/2074 |
| 2023/0020691 | A1* | 1/2023 | Thielemans | G09G 3/32 |

* cited by examiner

MICRO-LED DISPLAY PANEL AND PIXEL DRIVING CIRCUIT THEREOF

CROSS-REFERENCE TO RELATED PATENT APPLICATION

This non-provisional application claims priority to and the benefit of, pursuant to 35 U.S.C. § 119(a), patent application Serial No. 113119828 filed in Taiwan on May 29, 2024. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present disclosure relates to a micro light-emitting diode (LED) display panel and a pixel driving circuit thereof.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A micro light-emitting diode (micro-LED) exhibits characteristics such as flexibility, warping resistance and ease of bending, allowing a display to be cut into various shapes for a wide range of applicable products and tightly attached to different surfaces in various shapes, thus significantly enhancing the degree of freedom of the product design. In addition, the micro-LED exhibits high transparency, enabling a user to see through the display panel to the objects behind. The combination of high transparency and high brightness makes the micro-LED the ideal display technology for augmented reality (AR) and mixed reality (MR) applications, which is well-suited for diverse environments such as in-vehicle displays, operating rooms, smart windows, and commercial showcases.

The micro-LED is a novel display technology that employs tiny LEDs as the display pixels. Each micro-LED is a miniature individual light-emitting diode that may be used to display an image by controlling its brightness. A micro-LED display panel is formed by millions of micro-LEDs, and the micro-LEDs may be independently controlled in terms of color and brightness, thereby facilitating image displaying with high resolution and high contrast.

Certain advantages of the micro-LED include:

(1) Display Quality: The micro-LED may facilitate higher resolution and a wider color gamut, thus providing clearer and more vivid images.

(2) Contrast: The micro-LEDs may be independently controlled in terms of brightness, thus facilitating higher contrast, leading to sharper image quality.

(3) Energy Efficiency: Compared to the conventional liquid crystal display technology, the micro-LED display has higher energy efficiency because it does not require a backlight, and the micro-LED itself has higher energy efficiency.

(4) Lifespan: The micro-LED has a longer lifespan, lasting tens of thousands of hours or more, thus reducing the frequency of display replacements.

Overall, the micro-LED technology holds immense potential in the display industry, offering higher quality and more durable display solutions.

While the micro-LED may deliver exceptionally high brightness, it also presents several challenges: (1) the high brightness leads to increased power consumption, necessitating an energy-saving design; (2) the excessive brightness of the micro-LED may cause overheating issues; and (3) the excessive maximum brightness may result in insufficient precision at the low grayscale levels.

Regarding the issue of insufficient precision at the low grayscale levels, considering a 10-bit display panel set to 1000 nits, the 10-bit resolution may not be sufficient to accurately represent the subtle variations at the low grayscale levels, leading to a degradation in the image quality. Alternatively, increasing the bit depth for the display would incur additional storage space and potentially higher power consumption.

Therefore, a heretofore unaddressed need for a micro-LED display panel and a pixel driving circuit thereof exists in the art to address the aforementioned deficiencies and inadequacies.

SUMMARY

According to a first aspect of the present disclosure, a pixel driving circuit is provided to be coupled to and drive at least one pixel circuit. The pixel driving circuit includes: a first multiplexer; a frequency divider circuit, coupled to the first multiplexer; a first bit counter, coupled to the first multiplexer; a second bit counter, coupled to the frequency divider circuit; and a switch controller, coupled to the first multiplexer and the second bit counter. The first multiplexer switches a base frequency clock signal to the frequency divider circuit or the first bit counter according to a grayscale data signal. The frequency divider circuit divides the base frequency clock signal transmitted by the first multiplexer into a divided base frequency clock signal. The first bit counter counts the base frequency clock signal transmitted by the first multiplexer to generate a first switching signal. The second bit counter counts the divided base frequency clock signal transmitted by the frequency divider circuit to generate a second switching signal. The switch controller switches a switch of the at least one pixel circuit according to the first switching signal or the second switching signal.

According to a second aspect of the present disclosure, a micro light-emitting diode (LED) display panel includes a plurality of pixel driving circuits; and a plurality of pixel circuits, coupled to the pixel driving circuits. Each of the pixel driving circuits includes: a first multiplexer; a frequency divider circuit, coupled to the first multiplexer; a first bit counter, coupled to the first multiplexer; a second bit counter, coupled to the frequency divider circuit; and a switch controller, coupled to the first multiplexer and the second bit counter. The first multiplexer switches a base frequency clock signal to the frequency divider circuit or the first bit counter based on a grayscale data signal. The frequency divider circuit divides the base frequency clock signal transmitted by the first multiplexer into a divided base frequency clock signal. The first bit counter counts the base frequency clock signal transmitted by the first multiplexer to generate a first switching signal. The second bit counter counts the divided base frequency clock signal transmitted by the frequency divider circuit to generate a second switching signal. The switch controller switches a switch of each of the pixel circuits according to the first switching signal or the second switching signal.

These and other aspects of the present disclosure will become apparent from the following description of the embodiment taken in conjunction with the following drawings, detailed description and the claims.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

The technical terms used in the disclosure are based on the customary terminology in the technical field. If any term is specifically described or defined in the disclosure, the interpretation of such term shall be governed by the description or definition provided herein. The embodiments disclosed herein may have one or more technical features. To the extent permitted by applicable law, those skilled in the art may selectively implement some or all of the technical features of any embodiment, or selectively combine some or all of the technical features of these embodiments.

Figure 1:
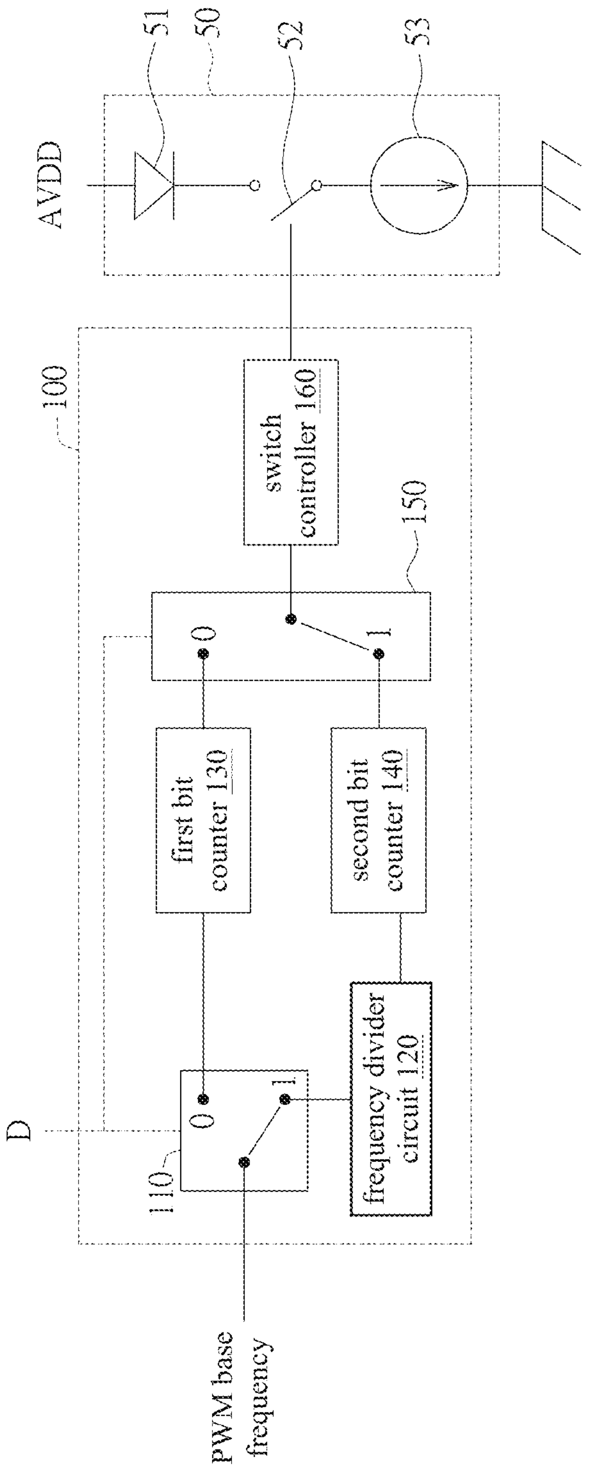
FIG. 1 illustrates a pixel driving circuit of a micro-LED display panel according to one embodiment of the present disclosure.

FIG. 1 illustrates a pixel driving circuit of a micro-LED display panel according to one embodiment of the present disclosure. The pixel driving circuit 100 may be coupled to and drive one or more pixel circuits 50. Each pixel circuit 50 includes a micro-LED 51, a switch 52 and a current source 53. The micro-LED 51 is coupled to an operating voltage AVDD. The switch 52 is coupled between the micro-LED 51 and the current source 53. The switch 52 is further coupled to the pixel driving circuit 100.

The pixel driving circuit 100 includes: a first multiplexer 110, a frequency divider circuit 120, a first bit counter 130, a second bit counter 140, a second multiplexer 150 and a switch controller 160.

The first multiplexer 110 switches a PWM base frequency clock signal to the frequency divider circuit 120 or the first bit counter 130 according to a grayscale data signal D. When the grayscale data signal D is higher than or equal to a grayscale threshold, the first multiplexer 110 switches the PWM base frequency clock signal to the frequency divider circuit 120. When the grayscale data signal D is lower than the grayscale threshold, the first multiplexer 110 switches the PWM base frequency clock signal to the first bit counter 130. The grayscale threshold may be, for example, a grayscale level of 30, without being limited thereto. In this case, the PWM base frequency clock signal may be, for example, a 12-bit signal, without being limited thereto.

The frequency divider circuit 120 is coupled to the first multiplexer 110, and the frequency divider circuit 120 divides the PWM base frequency clock signal transmitted by the first multiplexer 110 into a divided PWM base frequency clock signal. The frequency divider circuit 120 may be, for example, a divide-by-four frequency divider circuit, without being limited thereto.

The first bit counter 130 is coupled to the first multiplexer 110, and the first bit counter 130 counts the PWM base frequency clock signal transmitted by the first multiplexer 110 to generate a first switching signal (such as a PWM switching signal). The first bit counter 130 may be, for example, a 12-bit counter, without being limited thereto.

A PWM (pulse width modulation) bit counter is a device used to count the duration of the high state or the low state in a PWM signal. The PWM signal simulates an analog signal by varying the durations of the high and low states within a period. The PWM bit counter tracks the durations of these high or low states for performing the corresponding control or analysis. For example, a PWM signal has a period of 100 milliseconds, with a high state duration of 20 milliseconds and a low state duration of 80 milliseconds. The PWM bit counter may track this 20-millisecond high state, which is then used to calculate the duty cycle (the ratio of the high state time to the total period time) of the PWM signal, thereby controlling a corresponding device. Therefore, the PWM bit counter is a tool used to analyze the PWM signal, which may be used to control and monitor the signals in PWM applications. In other words, when the first bit counter 130 is a 12-bit counter, the first bit counter 130 counts the high state of the PWM base frequency clock signal with 12 bits.

The second bit counter 140 is coupled to the frequency divider circuit 120, and the second bit counter 140 counts the divided PWM base frequency clock signal transmitted by the frequency divider circuit 120 to generate a second switching signal. The second bit counter 140 may be, for example, a 10-bit counter, without being limited thereto. In other words, when the second bit counter 140 is a 10-bit counter, the second bit counter 140 counts the high state of the PWM base frequency clock signal with 10 bits.

The second multiplexer 150 is coupled to the first bit counter 130 and the second bit counter 140. The second multiplexer 150 transmits the first switching signal generated by the first bit counter 130 or the second switching signal generated by the second bit counter 140 to the switch controller 160 according to the grayscale data signal D. When the grayscale data signal D is higher than or equal to the grayscale threshold, the second multiplexer 150 transmits the second switching signal generated by the second bit counter 140 to the switch controller 160. When the grayscale data signal D is lower than the grayscale threshold, the second multiplexer 150 transmits the first switching signal generated by the first bit counter 130 to the switch controller 160.

The switch controller 160 is coupled to the second multiplexer 150. The switch controller 160 switches the switch 52 of the pixel circuit 50 according to the first switching signal or the second switching signal transmitted by the second multiplexer 150. When the switch 52 is on, the micro-LED 51 emits light. When the switch 52 is off, the micro-LED 51 does not emit light.

Figure 2:
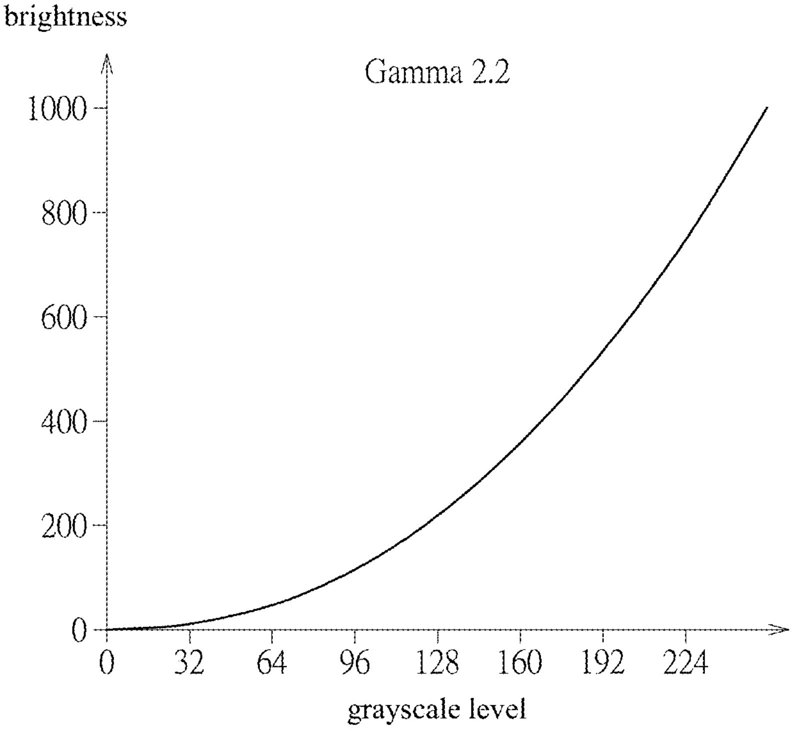
FIG. 2 is a brightness distribution chart according to one embodiment of the present disclosure.

FIG. 2 is a brightness distribution chart according to one embodiment of the present disclosure. As shown in FIG. 2, at the low grayscale region (e.g., the grayscale level being less than 30), the brightness distribution is relatively flat, thus resulting in brightness overlapping. Thus, in one embodiment of the present disclosure, a 12-bit PWM signal is used to drive the pixel circuit at the low grayscale region to prevent the issue of brightness overlapping.

The reasons for reducing the power consumption in one embodiment of the present disclosure are described as follows. The power may be expressed by the following formula (1).

$$P = VI = CV^2 f = V(CVf) \quad (1)$$

In the formula (1), V and I respectively represent the voltage and the current, C represents the capacitance of the switching component, and f represents the frequency.

The parameters V and C are constants. Thus, if the frequency f is reduced by a factor of 4, the operating current is also reduced by a factor of 4, for example, from 7.5 uA to 1.87 uA. Thus, the power consumption may also be reduced by a factor of 4.

Accordingly, in one embodiment of the present disclosure, when the PWM control signal is reduced from 12 bits to 10 bits, the frequency 4 is reduced by a factor of 4. Thus, the operating current is reduced by a factor of 4, and the power consumption is also reduced by a factor of 4.

Figure 3:
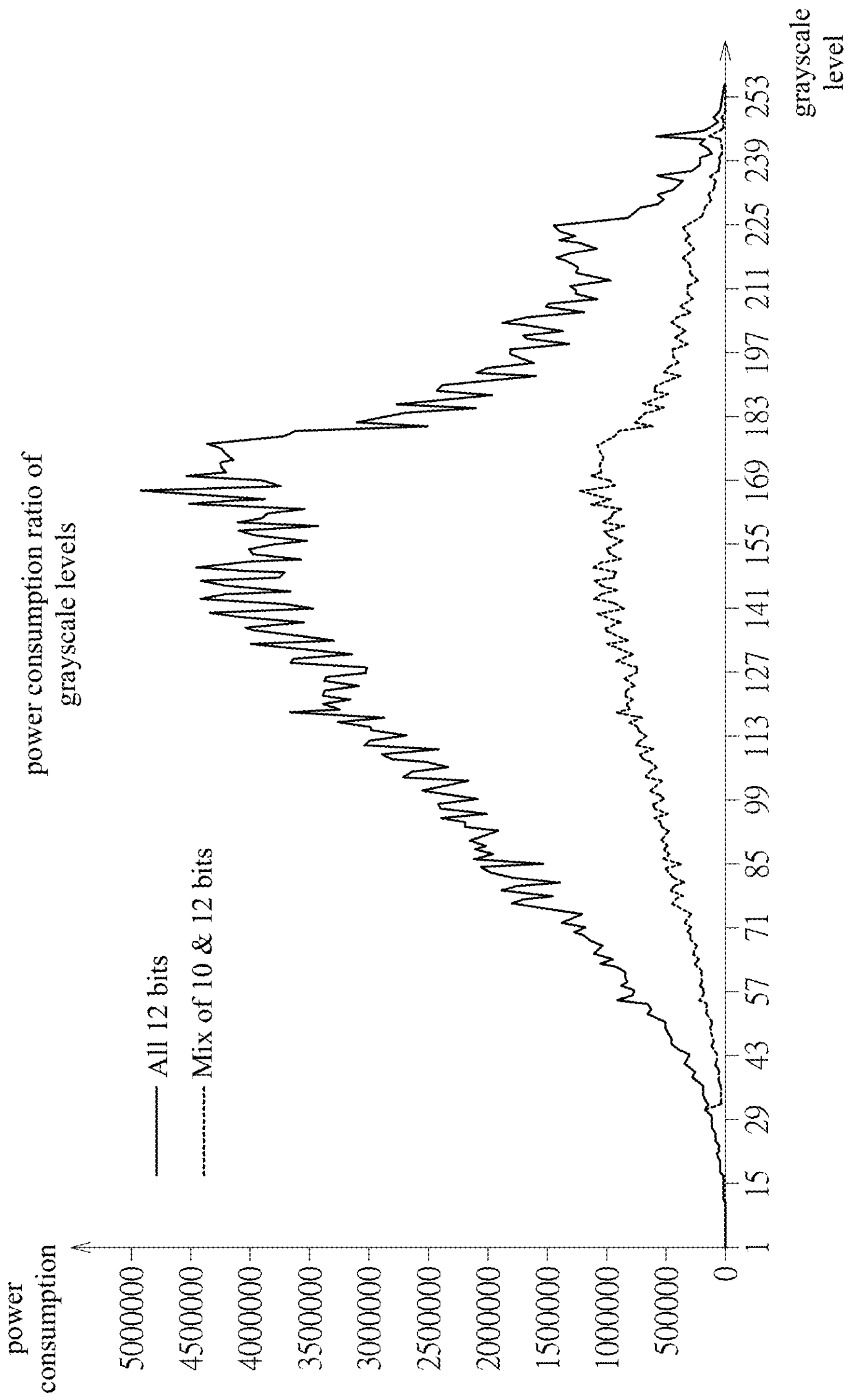
FIG. 3 is a chart illustrating the power consumption ratio of the grayscale levels according to one embodiment of the present disclosure.

FIG. 3 is a chart illustrating the power consumption ratio of the grayscale levels according to one embodiment of the present disclosure. As shown in FIG. 3, it may be observed that, compared to the power consumption when the PWM signal is completely in 12 bits, in one embodiment of the present disclosure, the 12-bit PWM signal and 10-bit PWM signal are mixed, and the energy consumption is reduced to be approximately 0.025253 times thereof, thus effectively reducing the power consumption.

Figure 4:
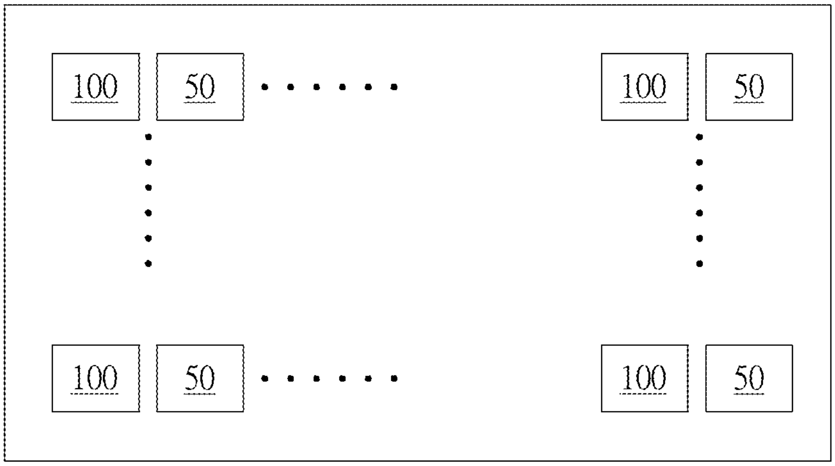
FIG. 4 is a schematic view illustrating a micro-LED display panel according to one embodiment of the present disclosure.

FIG. 4 is a schematic view illustrating a micro-LED display panel according to one embodiment of the present disclosure. As shown in FIG. 4, the micro-LED display panel 400 includes a plurality of pixel driving circuits 100 and a plurality of pixel circuits 50. Each pixel driving circuit 100 and each pixel circuit 50 may be similar to those as shown in FIG. 1, and are thus not hereinafter reiterated.

In one embodiment of the present disclosure, the low grayscale data signal utilizes 12 bits to control the PWM waveforms, resulting in better precision.

In one embodiment of the present disclosure, the pixel driving circuit 100 achieves power saving by the frequency divider circuit and the switch controller. This is because, to meet different grayscale precision requirements, the frequency divider circuit is designed to generate various base frequencies, and the switch controller switches the frequency based on the data to be displayed by the pixel circuit, thus displaying the desired image at different frequencies.

In one embodiment of the present disclosure, each pixel driving circuit 100 may respectively utilize a suitable display precision based on different grayscale levels.

In one embodiment of the present disclosure, the high grayscale regions utilizes lower bits to generate the PWM control signal, which may efficiently save power consumption.

While the disclosure may describe numerous specific details, these should not be construed as limiting the scope of the claimed invention but rather as descriptions of the features of specific embodiments. Certain features described in the context of individual embodiments in the disclosure may also be implemented in combination in a single embodiment. Conversely, various features described in the context of a single embodiment may be implemented individually or in any suitable subcombination in multiple embodiments. Moreover, although features may initially be described as operating in certain combinations, and may even be initially recited as such, in some cases one or more features may be omitted from such combination, and the recited combination may be directed to a subcombination or variation of a subcombination. Similarly, although operations are illustrated in the drawings as occurring in a particular order, this should not be construed as requiring these operations to be performed in the particular order shown or requiring all illustrated operations to be performed in order to achieve the desired result.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A pixel driving circuit, coupled to and driving at least one pixel circuit, the pixel driving circuit comprising:

a first multiplexer;

a frequency divider circuit, coupled to the first multiplexer;

a first bit counter, coupled to the first multiplexer;

a second bit counter, coupled to the frequency divider circuit; and a switch controller, coupled to the first multiplexer and the second bit counter, wherein:

the first multiplexer switches a base frequency clock signal to the frequency divider circuit or the first bit counter according to a grayscale data signal;

the frequency divider circuit divides the base frequency clock signal transmitted by the first multiplexer into a divided base frequency clock signal;

the first bit counter counts the base frequency clock signal transmitted by the first multiplexer to generate a first switching signal;

the second bit counter counts the divided base frequency clock signal transmitted by the frequency divider circuit to generate a second switching signal; and the switch controller switches a switch of the at least one pixel circuit according to the first switching signal or the second switching signal.

2. The pixel driving circuit according to claim 1, wherein when the grayscale data signal is higher than or equal to a grayscale threshold, the first multiplexer switches the base frequency clock signal to the frequency divider circuit; and when the grayscale data signal is lower than the grayscale threshold, the first multiplexer switches the base frequency clock signal to the first bit counter.

3. The pixel driving circuit according to claim 1, wherein:

the base frequency clock signal is a pulse width modulation (PWM) base frequency clock signal;

the frequency divider circuit is a divide-by-four frequency divider circuit;

the first bit counter is a 12-bit counter; and the second bit counter is a 10-bit counter.

4. The pixel driving circuit according to claim 1, further comprising:

a second multiplexer, coupled to the first bit counter, the second bit counter and the switch controller, wherein the second multiplexer transmits the first switching signal generated by the first bit counter or the second switching signal generated by the second bit counter to the switch controller according to the grayscale data signal.

5. The pixel driving circuit according to claim 4, wherein when the grayscale data signal is higher than or equal to a grayscale threshold, the second multiplexer transmits the second switching signal generated by the second bit counter to the switch controller; and when the grayscale data signal is lower than the grayscale threshold, the second multiplexer transmits the first switching signal generated by the first bit counter to the switch controller.

6. A micro light-emitting diode (LED) display panel, comprising:

a plurality of pixel driving circuits; and a plurality of pixel circuits, coupled to the pixel driving circuits;

wherein each of the pixel driving circuits comprises:

a first multiplexer;

a frequency divider circuit, coupled to the first multiplexer;

a first bit counter, coupled to the first multiplexer;

a second bit counter, coupled to the frequency divider circuit; and a switch controller, coupled to the first multiplexer and the second bit counter, wherein:

the first multiplexer switches a base frequency clock signal to the frequency divider circuit or the first bit counter according to a grayscale data signal;

the frequency divider circuit divides the base frequency clock signal transmitted by the first multiplexer into a divided base frequency clock signal;

the first bit counter counts the base frequency clock signal transmitted by the first multiplexer to generate a first switching signal;

the second bit counter counts the divided base frequency clock signal transmitted by the frequency divider circuit to generate a second switching signal; and the switch controller switches a switch of each of the pixel circuits according to the first switching signal or the second switching signal.

7. The micro-LED display panel according to claim 6, wherein:

when the grayscale data signal is higher than or equal to a grayscale threshold, the first multiplexer switches the base frequency clock signal to the frequency divider circuit; and when the grayscale data signal is lower than the grayscale threshold, the first multiplexer switches the base frequency clock signal to the first bit counter.

8. The micro-LED display panel according to claim 6, wherein:

the base frequency clock signal is a pulse width modulation (PWM) base frequency clock signal;

the frequency divider circuit is a divide-by-four frequency divider circuit;

the first bit counter is a 12-bit counter; and the second bit counter is a 10-bit counter.

9. The micro-LED display panel according to claim 6, wherein each of the pixel driving circuits further comprises:

a second multiplexer, coupled to the first bit counter, the second bit counter and the switch controller, wherein the second multiplexer transmits the first switching signal generated by the first bit counter or the second switching signal generated by the second bit counter to the switch controller according to the grayscale data signal.

10. The micro-LED display panel according to claim 9, wherein:

when the grayscale data signal is higher than or equal to a grayscale threshold, the second multiplexer transmits the second switching signal generated by the second bit counter to the switch controller; and when the grayscale data signal is lower than the grayscale threshold, the second multiplexer transmits the first switching signal generated by the first bit counter to the switch controller.

* * * * *